Feb. 27, 1940.   C. B. COATES   2,191,608
ELECTRIC HAMMER ATTACHMENT
Filed March 18, 1938   2 Sheets-Sheet 1
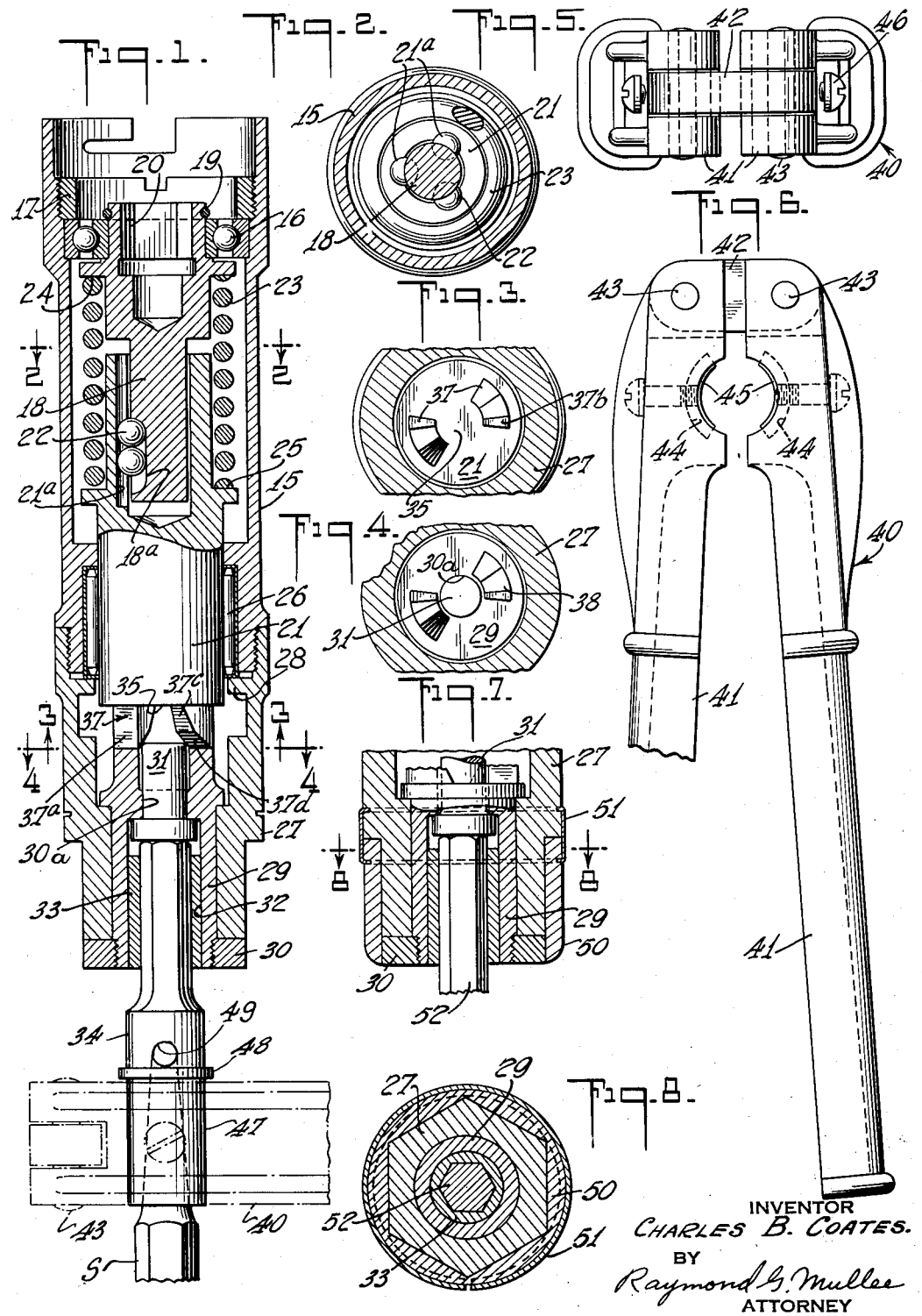
INVENTOR
CHARLES B. COATES.
BY
Raymond G. Mullee
ATTORNEY Feb. 27, 1940.   C. B. COATES   2,191,608
ELECTRIC HAMMER ATTACHMENT
Filed March 18, 1938   2 Sheets-Sheet 2
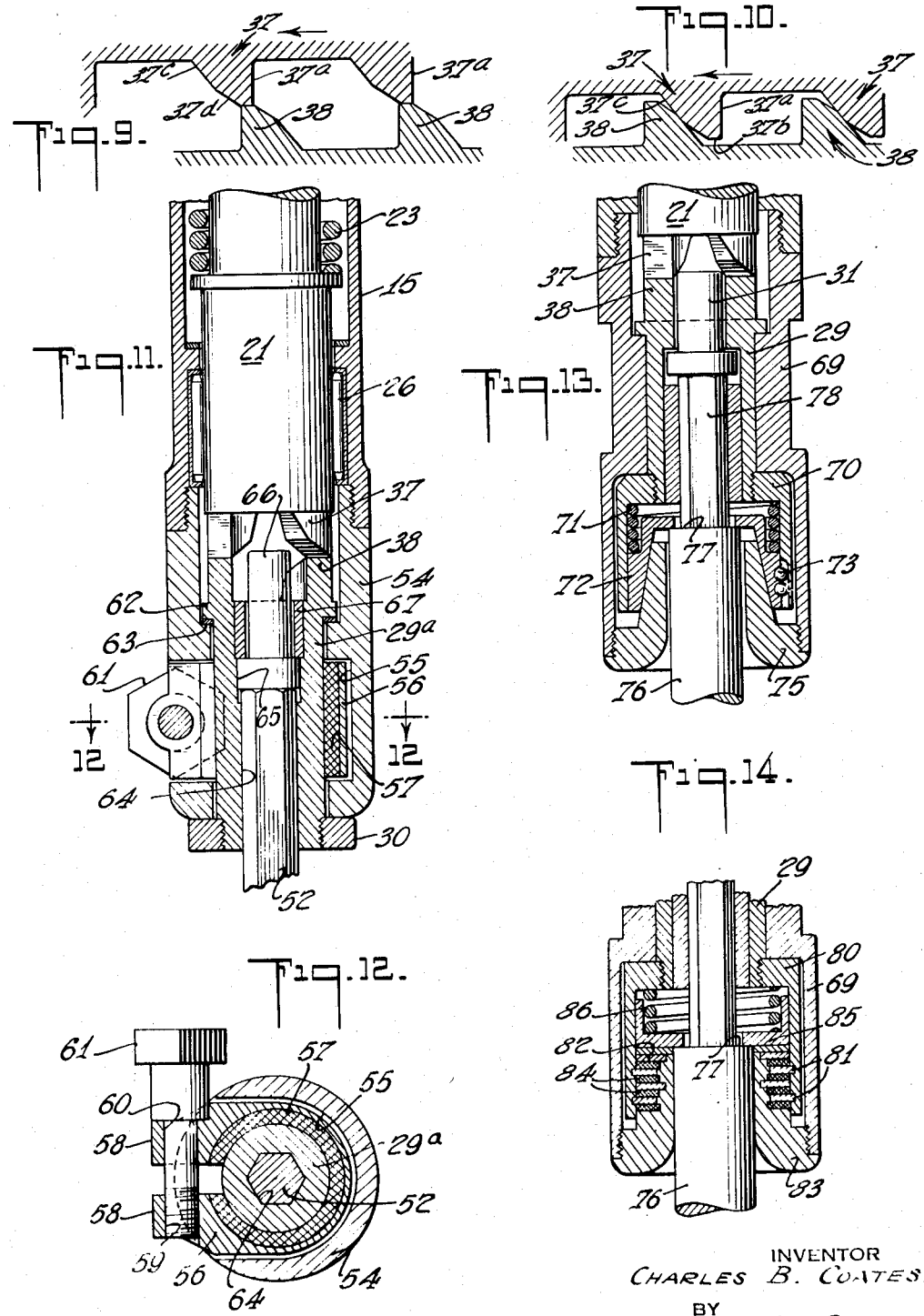
INVENTOR
CHARLES B. COATES.
BY
ATTORNEY Patented Feb. 27, 1940

2,191,608

UNITED STATES PATENT OFFICE 2,191,608

ELECTRIC HAMMER ATTACHMENT

Charles B. Coates, Cleveland, Ohio, assignor to Chicago Pneumatic Tool Company, New York, N. Y., a corporation of New Jersey Application March 18, 1938, Serial No. 196,727

4 Claims. (Cl. 255—42)

This invention relates to power hammers and more particularly to an attachment for an electric drill for converting the rotary movement of a shaft into a reciprocating hammer action. The attachment is of the type which comprises a reciprocating striking piston, a spring for moving the piston toward the drill steel or other working tool and a set of cams for moving the piston in the opposite direction.

An object of the invention is to rotate the drill steel or working tool automatically but under manual control. In accordance with the present invention, the piston cams cooperate with a set of cams formed on a bushing in which the drill steel is mounted. The piston revolves with the drive shaft while rotation of the bushing is retarded, thus causing the piston to rise and fall as it delivers impacts to the working tool. The resistance of the bushing, and therefore of the working tool, to rotation is determined by the amount of frictional force, which is regulated by the operator.

A feature of the invention resides in a double spiral surface on the lifting cams, the engaging faces of the cams having at first a relatively steep slope resulting in the delivery of a substantial rotation component of force to the bushing and a secondary cam surface having a more gradual slope for further lifting the piston without requiring excessive power.

Other objects and features of the invention will appear more clearly from the following description taken in connection with the accompanying drawings and appended claims.

In the accompanying drawings in which like reference numerals designate like parts:

Fig. 1 is a longitudinal section of an electric hammer attachment embodying one form of the invention, parts being shown in elevation;

Fig. 2 is a cross section as indicated by the arrows 2 in Fig. 1;

Fig. 3 is a cross section as indicated by the arrows 3 in Fig. 1, illustrating the cams at the lower end of the striking piston;

Fig. 4 is a cross section as indicated by the arrows 4 in Fig. 1, illustrating the cams at the upper end of the cam bushing;

Fig. 5 is an end view, and Fig. 6 a plan view, of a hand clamp adapted to be attached to the drill holder shown in Fig. 1 for controlling the rotation of the latter;

Fig. 7 is a fragmentary sectional view of a hammer attachment similar to that of Fig. 1 but provided with a device for locking the cam bushing and working tool against rotation;

Fig. 8 is a cross section as indicated by the arrows 8 in Fig. 7;

Fig. 9 is a development of the upper and lower cams arranged in the relative position shown in Figs. 1, 3 and 4;

Fig. 10 is a development of the cams in a different relative position from that shown in Fig. 9;

Fig. 11 is a fragmentary view similar to Fig. 1 but showing a modified arrangement for controlling rotation of the cam bushing and working tool;

Fig. 12 is a cross section as indicated by the arrows 12 in Fig. 11; and

Figs. 13 and 14 are fragmentary views similar to Fig. 1 but showing modified clutch mechanism for controlling the rotation of the cam bushing.

The preferred form of the invention, illustrated in Figs. 1 to 6 inclusive, 9 and 10, comprises a barrel 15 which houses and supports the operative parts of the hammer device. The barrel is open at its upper end where it is provided with a bayonet slot and is adapted for attachment to any suitable portable electric drill (not shown) for converting the latter into an electric hammer. A ball bearing 16 is supported near the upper end of the barrel 15 between a threaded retainer ring 17 and a shoulder on the barrel. The bearing rotatably supports a drive shaft 18, which is held against relative axial movement by a snap ring 19 and a shoulder on the drive shaft 18. The shaft has a polygonal socket 20 to receive a driving spindle (not shown).

A striking piston 21 has a driving connection with the drive shaft 18 which comprises complementary longitudinal grooves 21a and 18a and balls 22 permitting axial movement of the piston. A coiled compression spring 23, interposed between shoulders 24 and 25 on the drive shaft and piston respectively, urges the latter downwardly. The piston is supported for rotary and axial movement relative to barrel 15 by means of a roller or needle bearing 26 mounted in a counterbore at the lower end of barrel 15.

A barrel extension or nose piece 27 is screwed to the lower end of the barrel 15 and has a shoulder 28 acting as a retainer for the needle bearing 26. The nose piece provides a bearing for a cam bushing 29. Axial movement of the cam bushing is prevented by a nut 30 screwed to the lower end of the bushing and by complementary shoulders on the nose piece and bushing. The cam bushing 29 has a bore 30a, within which an anvil piece 31 telescopes, and has a counterbore 32 receiving the head of the anvil piece. Counterbore 32 also receives a chuck 33 held therein by a press fit and adapted to support a drill holder 34 of any suitable type. The holder supports a working tool such as a chisel or drill steel S. It will be understood that as the striking piston 21 reciprocates, the striking face 35 thereon delivers a succession of impacts to the upper end of the anvil piece 31 which transmits the blows to the drill holder 34.

An important feature of the invention resides in a cam arrangement between the striking piston 21 and the cam bushing 29. The cams serve the dual function of complementing the action of spring 23 to reciprocate the piston and of rotating the drill holder 34 between impacts. As shown in Figs. 1, 3 and 4, the cams 37 which are integral with the striking piston 21 are in the form of arcuate segments partly surrounding the striking face 35. Each cam comprises a rear face 37a, lying substantially in a plane coinciding with the axis of rotation, a crest 37b, and two front faces 37c and 37d inclined at different angles relative to the plane of the striking face 35 to form a double spiral. The cams 38, formed on the upper edge of the cam bushing 29, have the same shape as the cams 37, as will be apparent from a comparison between Figs. 3 and 4. The height of the cams 37 and 38 is somewhat less than the distance between striking face 35 and anvil piece 31 when the parts are in the Fig. 1 position, whereby the crests of the cams 37 are prevented from striking the flat surfaces on the bushing 29 between the cams 38.

Rotation of the cam bushing 29 and drill holder 34 may be controlled by a manipulative clamp 40 shown in Figs. 5 and 6. The clamp comprises a pair of arms 41 each bifurcated at one end where it is connected to a link 42 by means of a pivot pin 43. The arms are provided with complementary cradle portions 44 in which are seated brake linings 45 secured to the arms by screws 46. The cradle portions and brake linings are shaped to fit and embrace a cylindrical portion 47 on the drill holder 34 as shown in Fig. 1. The ends of the arms remote from the pivot pins 43 are adapted to be grasped by the hand of the operator and brought together to force the brake linings into frictional engagement with the drill holder 34. A collar 48, at the upper end of the cylindrical portion 47 on the drill holder, limits upward movement of the clamp 40, thereby preventing contact of the latter with the edges of the drift pin hole 49.

In operation, the rotatable shaft 18 drives the striking piston 21 through the balls 22. The compression spring 23 tends to hold the piston 21 in its lowermost position in which the piston cams 37 have a rotatable driving connection with the cams 38 on the bushing 29, as illustrated in Fig. 10. If there is no substantial resistance to rotation of the drill holder 34, the piston remains in its lowermost position and the drive shaft 18, piston 21, bushing 29 and drill holder 34 rotate in unison. To effect a hammering action on the anvil piece 31, the operator retards rotation of the drill holder 34 by applying pressure to the hand clamp 40. Piston cams 37 then climb over the spiral surfaces of the cams 38, moving the striking piston 21 upward to compress spring 23 and store energy therein. The maximum compression of the spring is obtained when the flat faces 37b on the piston cams ride over the corresponding edges of cams 38, as illustrated in Figs. 1 and 9. Upon disengagement of the cams, the piston is released for downward striking movement under the influence of spring 23 and the striking face 35 on the piston delivers a blow to the anvil piece 31 which is transmitted to the drill holder 34 and the working tool or drill steel S. At the same time, the piston cams 37 drop to a position between the bushing cams 38 but out of contact with the bushing cams or bushing 29. Continued rotation of the striking piston, after it has completed its axial movement, causes the steep spiral face 37c on each piston cam 37 to strike the corresponding face on cam 38, causing a partial rotation of the bushing 29 and drill holder 34, thereby completing a cycle of operation. Thus a series of axial impacts is delivered to the drill holder 34, each of which is followed by a discrete rotative impulse imparted to the bushing 29.

Due to the provision of a double spiral 37c and 37d, the cams strike each other along a steep angle surface to impart a relatively large rotative component of force to the bushing 29 for a very short period of time, after which a less steep incline is encountered to lift the piston against the pressure of spring 23. Were the cams formed with a constant angle of elevation throughout the entire camming surface, there would be a very small component of force tending to revolve the cam bushing 29, unless the angle were made extremely steep, in which event more work would have to be done by the motor in lifting the piston.

When drilling stone or concrete, it is desirable to keep the rotation very slow in order to prevent excessive wear on the cutting edges of the drill steel. The speed of rotation can be controlled easily by varying the hand pressure on the clamp 40; the greater the pressure the slower the rotative speed of the drill holder and drill steel.

Figs. 7 and 8 illustrate an arrangement for locking the bushing 29 against rotation, which may be employed when the device is used as a chipping hammer. The locking arrangement comprises a sleeve 50 having a hexagonal opening throughout its length to fit the nut 30 and the reduced lower end of the nose piece or barrel extension 27. A split resilient snap ring 51 engages annular grooves in the nose piece 27 and locking sleeve 50 to hold the latter in place. A working tool, such as a chisel 52, may receive the impacts delivered through the anvil piece 31. The nut 30 and the lower extremity of the bushing 29 are provided with complementary right-hand threads and, since the nut is locked by the sleeve 50, it prevents the bushing 29 from moving in the direction of the rotative impacts delivered thereto by the piston cams 37. In this embodiment of the invention, the only motion imparted to the tool 52 is along its axis in response to the axial hammer blow.

Figs. 11 and 12 illustrate a modified form of brake for controlling resistance of the bushing 29a to rotation. In this embodiment, the frictional force is applied direct to the bushing 29a rather than to a drill holder, as in the case of Fig. 1. The barrel extension or nose piece 54 has a recess 55 open at one side to receive a resilient clamp 56. Suitable brake lining material 57 is attached to the inner surface of the clamp and is adapted to embrace the bushing 29a. The clamp 56 is generally of arcuate shape and terminates in two parallel arms 58 projecting beyond the side of the nose piece 54. One arm has a threaded opening 59 in axial alignment with a bore 60 in the other arm. A screw 61, having threaded engagement with the opening 59, provides means for drawing the arms together. Bushing 29a is secured against axial movement relative to the nose piece 54 by means of nut 30 and shoulder 62. A washer 63 provides a seat for the shoulder. The bushing 29a has a polygonal socket 64 receiving the working tool 52, a bore 65 which slidably receives the head of an anvil piece 66, and a counterbore in which a retainer bushing 67 is mounted with a press fit. Cams 37 and 38 are carried by the striking piston 21 and bushing 29a respectively. The construction and function of the cams are similar to those described in connection with the Fig. 1 embodiment.

By turning the adjusting screw 61, the operator may regulate the braking pressure on the bushing 29a, thereby controlling the rate of rotation of the bushing and working tool 52.

Fig. 13 shows a modified brake for the cam bushing which is regulated by the axial pressure of the working tool. The cam bushing 29, in this embodiment, is supported for rotation in the barrel extension or nose piece 69 and is threadably secured at its lower end to a cup-shaped retainer 70 mounted in a recess in the nose piece. The retainer 70 houses a spring 71 and a movable clutch plate 72. Balls 73, mounted in longitudinal grooves in the retainer 70, permit the plate 72 to move axially, but not rotate, with respect to retainer 70 and bushing 29. A fixed clutch plate 75 is secured to the lower extremity of the barrel extension 69. The engaging surfaces of the plates 75 and 72 are tapered to form a cone clutch. A tool holder 76 has a shoulder 77 abutting against the movable plate 72 and has an extension 78 adapted to receive impacts delivered by the piston 21 through the anvil piece 81. A working tool (not shown) is adapted to be supported by the holder 76. In operation, the barrel extension 69 is forced manually toward the work causing the tool holder 76 to move rearward relative to the fixed clutch plate 75. The shoulder 77 on the tool holder acts against movable plate 72 to relieve the pressure of spring 71 by an amount determined by the operator. Since the tool holder 76, cam bushing 29, retainer 70 and movable clutch plate 72 are coupled to rotate in unison, the rate of rotation of the bushing 29 is determined by the resultant pressure tending to hold the friction surfaces of the plates 72 and 75 together. To reduce the friction and thereby increase the rate of rotation of the tool, the operator increases the axial pressure of the barrel extension 69 against the tool holder 76.

Fig. 14 shows a modified form of clutch designed for substantially the same purpose as the clutch illustrated in Fig. 13. A cup-shaped retainer 80 screwed to the lower end of the cam bushing 29 provides the rotatable element of a friction brake. A series of clutch plates 81 and 82 are keyed to the retainer 80 and fixed clutch member 83 respectively. Brake linings 84 are interposed between the fixed plates 82 and the rotatable plates 81. The fixed clutch member 83 is screwed to the bottom of the barrel extension 69. A thrust plate 85, slidably mounted in retainer member 80, is pressed against the clutch elements by a spring 86. Normally, the pressure of spring 86 prevents substantial rotation of clutch plates 81 with the associated retainer member 80, cam bushing 29 and drill holder 76. Rearward pressure of the shoulder 77 on the drill holder against the thrust plate 85 relieves part of the spring pressure on plate 85, thereby permitting rotation of the cam bushing and drill holder.

What is claimed is:

1. A power hammer comprising a barrel, a rotatable driving cam element mounted therein, a complementary driven cam element, said cam elements being coaxial and one of them located in front of the other, the front cam element being held against forward axial movement relative to the barrel whereby relative rotation between the cam elements effects rearward movement of the rear cam element, a braking device for applying a variable resistance to rotation of the driven cam element to effect rearward movement of the rear cam element, a striking piston carried by the rear cam element, a spring acting on the striking piston to move it forwardly to deliver a hammer blow upon release of the engagement between the cam elements, a tool movable rearwardly to an operative position in which it receives blows delivered by the striking piston, said braking device having a friction element fixed to the barrel and a complementary movable friction element, the latter being engageable with the tool upon rearward movement thereof to move away from frictional engagement with the friction element first-mentioned, whereby rearward pressure by the tool releases the frictional force resisting rotation of the driven cam element.

2. A power hammer according to claim 1 in which the movable friction element is urged forwardly toward frictional locking position by means of a spring.

3. A power hammer according to claim 1 in which the tool is held against rotary movement relative to the driven cam element.

4. A power hammer comprising a barrel, a rotatable driving cam element mounted therein, a complementary driven cam element, said cam elements being coaxial and one of them located in front of the other, the front cam element being held against forward axial movement relative to the barrel whereby relative rotation between the cam elements effects rearward movement of the rear cam element, a braking device for applying a variable resistance to rotation of the driven cam element to effect rearward movement of the rear cam element, a striking piston carried by the rear cam element, a spring acting on the striking piston to move it forwardly to deliver a hammer blow upon release of the engagement between the cam elements, a tool movable rearwardly to an operative position in which it receives blows delivered by the striking piston, said tool being held against rotation relative to the driven cam element, said cam elements each comprising a plurality of circumferential spaced cams, all of substantially the same shape and each having a driving surface including a spiral portion of relatively steep slope near the base and a spiral portion of less slope near the crest of the cam, said cams being separated by spaces wider than the cams to permit the striking piston to complete its axial movement and deliver a hammer blow while the cams are out of engagement and to cause the delivery of a rotative impulse to the steep surfaces of the driven cams subsequent to such axial movement.

CHARLES B. COATES.